(12) United States Patent
Hirsch et al.

(10) Patent No.: US 8,083,816 B1
(45) Date of Patent: Dec. 27, 2011

(54) PRODUCTION OF HYDROGEN BY MEANS OF A MECHANICAL SCRAPER ON ALUMINUM IN AN AQUEOUS MEDIUM

(75) Inventors: Robert L. Hirsch, Alexandria, VA (US); Gregory Scott Hirsch, Washington, DC (US)

(73) Assignee: Robert L Hirsch, Alexandria, VA (US)

( * ) Notice: Subject to any disclaimer, the term of this patent is extended or adjusted under 35 U.S.C. 154(b) by 0 days.

(21) Appl. No.: 12/887,589

(22) Filed: Sep. 22, 2010

Related U.S. Application Data

(60) Provisional application No. 61/246,114, filed on Sep. 26, 2009.

(51) Int. Cl.
*B01J 7/00* (2006.01)
*H01M 8/06* (2006.01)
*C01B 3/36* (2006.01)
*C01B 6/24* (2006.01)
*C01B 3/02* (2006.01)
*C01B 3/08* (2006.01)

(52) U.S. Cl. ........ 48/61; 48/197 R; 423/644; 423/648.1; 423/657

(58) Field of Classification Search .......... 48/61, 197 R; 423/657, 644, 648.1
See application file for complete search history.

(56) References Cited

U.S. PATENT DOCUMENTS

| | | | |
|---|---|---|---|
| 3,443,742 A | 5/1969 | Hirsch | |
| 6,506,360 B1 | 1/2003 | Andersen et al. | |
| 7,008,294 B2 * | 3/2006 | Junker | ............................... 451/5 |
| 7,008,609 B2 | 3/2006 | Watanabe et al. | |
| 7,200,954 B2 | 4/2007 | Watanabe et al. | |
| 7,235,226 B2 | 6/2007 | Watanabe et al. | |
| 7,625,655 B1 * | 12/2009 | Becerra et al. | ................. 429/447 |
| 2001/0047576 A1 * | 12/2001 | Love et al. | .................... 29/81.06 |
| 2007/0081939 A1 * | 4/2007 | Berry et al. | .................... 423/657 |
| 2007/0237994 A1 | 10/2007 | Nakai et al. | |
| 2009/0041657 A1 | 2/2009 | Miki et al. | |

FOREIGN PATENT DOCUMENTS

| | | |
|---|---|---|
| EP | 0055134 | 6/1982 |
| JP | 2001031401 | 2/2001 |
| JP | 2001031401 A * | 2/2001 |

OTHER PUBLICATIONS

Certified Translation of JP 2001-031401A (Jun. 2011).*
Machine Translation of JP2001031401.

\* cited by examiner

*Primary Examiner* — Matthew Merkling

(57) ABSTRACT

An apparatus, method, and system for producing hydrogen gas by mechanical scraping of a surface of an aluminum-containing material, in the presence of an aqueous medium, the apparatus including: (a) a reaction chamber having a discharge port, and adapted to sealably contain the aqueous medium; (b) an aluminum-containing workpiece having a working surface; (c) a scraping mechanism having a brush adapted to contact the working surface, the workpiece and the scraping element disposed within the chamber, the surface and the scraping element adapted to move in a relative motion, whereby, in an operating condition, the scraping element scrapes against the working surface to effect a liberation of aluminum-containing particles from the workpiece, the chamber adapted to be substantially sealed with respect to an ambient environment, up to a superatmospheric pressure threshold, and further adapted whereby, during contacting of the aqueous medium and the particles within the chamber, the hydrogen gas is evolved and selectively discharged through the discharge port, when a pressure in the chamber exceeds the threshold.

20 Claims, 11 Drawing Sheets

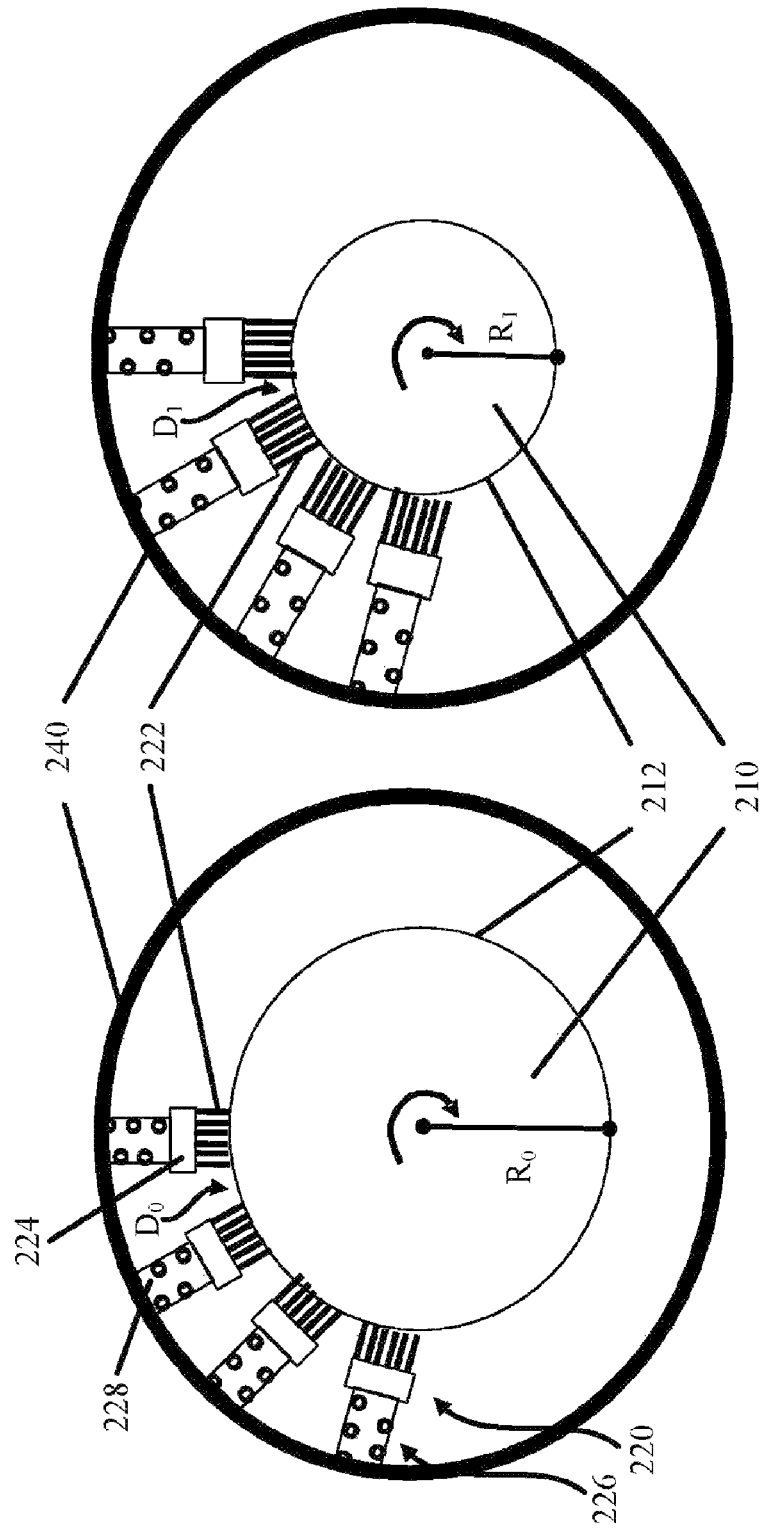

US 8,083,816 B1

PRODUCTION OF HYDROGEN BY MEANS OF A MECHANICAL SCRAPER ON ALUMINUM IN AN AQUEOUS MEDIUM

CROSS-REFERENCE TO RELATED APPLICATIONS

This application draws priority from U.S. patent application Ser. No. 61/246,114, filed Sep. 26, 2009, which is hereby incorporated by reference for all purposes as if fully set forth herein.

FIELD AND BACKGROUND OF THE INVENTION

The present invention relates to hydrogen production by reaction of aluminum metal with water, and more particularly, to a system and method of producing hydrogen gas by mechanical scraping of aluminum-containing surface in the presence of an aqueous medium.

Aluminum metal is known to react intensely with water. Production of hydrogen by means of the aluminum-water reaction is typically represented as:

$$2Al + 3H_2O \rightarrow Al_2O_3(s) + 3H_2(g) \quad (1)$$

but may occur in more than one step, for example, according to the following two-step representation:

$$2Al + 6H_2O \rightarrow 2Al(OH)_3 + 3H_2(g) \quad (2)$$

$$2Al(OH)_3 \rightarrow Al_2O_3(s) + 3H_2O \quad (3)$$

The reaction produces aluminum oxide on the surface of the aluminum, which substantially passivates the surface and reduces or entirely stops further reaction. Sundry efforts to achieve a sustained production rate of hydrogen have been made, and have been summarized in U.S. Pat. No. 6,506,360 to Andersen et al. These efforts include utilizing special aluminum-based alloys, introducing chemical additives, introducing catalytic materials, using a liquid or molten aluminum source, and applying a high power pulse of electrical current to initiate a reaction between an aluminum or aluminum alloy powder and water.

European Patent No. 0055134 B1 discloses a method for the production of hydrogen by inducing an electrical discharge between aluminum wire and an aluminum drum, both of which are immersed in water. When a voltage is applied between the wire and drum, an arching discharge takes place between them, inducing an electro-plasmic reaction. The reaction produces hydrogen and oxygen gas and aluminum oxide. The arcing between the wire and drum helps remove the oxide layer formed on the wire tip, exposing fresh aluminum to the water, whereby a continuous generation of hydrogen gas may be achieved.

Japanese Patent Document No. JP2001-31401A discloses a method for producing hydrogen gas, by a cutting processing or a grinding processing of aluminum or an aluminum alloy in water.

Various approaches to achieve a sustained production rate of hydrogen have been disclosed by U.S. patent application Publication No. 2007/0237994 to Nakai et al., and by U.S. Pat. Nos. 7,008,609, 7,200,954, and 7,235,226 to Watanabe et al.

The variety of these approaches, coupled with the exotic nature of many of these approaches, suggests there is a long-felt, unsatisfied need for improvements in methods and systems for producing hydrogen by reaction of aluminum metal with water.

SUMMARY OF THE INVENTION

Our invention meets this need in a variety of ways. According to the teachings of the present invention there is provided an apparatus for producing hydrogen gas by mechanical scraping of a surface of an aluminum-containing material, in the presence of an aqueous medium, the apparatus including: (a) a reaction chamber having a discharge port, and adapted to sealably contain the aqueous medium; (b) an aluminum-containing workpiece having a working surface; (c) a scraping mechanism having at least one scraping element adapted to contact the working surface, the aluminum-containing workpiece and the scraping element disposed within the chamber, the surface and the scraping element adapted to move in a relative motion, whereby, in an operating condition, the scraping element scrapes against the working surface to effect a liberation of aluminum-containing particles from the aluminum-containing workpiece, the chamber adapted to be substantially sealed with respect to an ambient environment, up to a superatmospheric pressure threshold, the chamber further adapted whereby, during contacting of the aqueous medium and the particles within the chamber, the hydrogen gas is evolved and selectively discharged through the discharge port, when a pressure in the chamber exceeds the threshold.

While the apparatus may advantageously produce the hydrogen gas by mechanical scraping of an aluminum surface, other reactive metals such as magnesium, a magnesium alloy, or magnesium-containing materials may also be scraped and reacted with water or an aqueous solution to produce the hydrogen gas.

According to another aspect of the present invention there is provided a method of producing hydrogen gas by mechanical scraping of a surface of an aluminum-containing material, in the presence of an aqueous medium, the method including the steps of: (a) providing the apparatus as described herein; (b) scraping the working surface to liberate the particles from the aluminum-containing workpiece; (c) contacting the working surface and the particles with the aqueous medium, within the reaction chamber, to at least partially oxidize the working surface and the particles, and to produce the hydrogen gas; and (d) effecting a withdrawal of the hydrogen gas, at superatmospheric pressure, from the chamber.

According to further features in the described preferred embodiments, the scraping mechanism includes a mechanically driven rotating shaft assembly that is at least partially enveloped by at least one scraping element or unit.

According to still further features in the described preferred embodiments, the apparatus further includes a mounting assembly adapted to receive the workpiece, and a rotating drive mechanism adapted to rotate the workpiece to effect the relative motion.

According to still further features in the described preferred embodiments, the working surface is a generally cylindrical or conical surface, and the at least one scraping element has a scraping surface substantially conforming to the cylindrical or conical surface.

According to still further features in the described preferred embodiments, the working surface of the workpiece is disposed in a slotted aluminum-containing block, wherein at least one slot is adapted to receive a brush having a scraping surface.

According to still further features in the described preferred embodiments, the scraping element includes at least one brush (abrasive) unit, the brush having a contact area, whereby, under operating conditions, the contact area is adapted to contact at least 10%, 20%, 30%, 40%, 50%, but typically less than 95%, less than 90%, or less than 85% of the working surface.

According to still further features in the described preferred embodiments, the at least one brush unit is a plurality of brush units set in spaced condition around the cylindrical surface.

According to still further features in the described preferred embodiments, the scraping mechanism has a spring assembly having at least one spring, the assembly and the spring adapted to exert a substantially radial force on the working surface.

According to still further features in the described preferred embodiments, the spring assembly is adapted to continuously exert the radial force on the working surface as a diameter of the workpiece is reduced by a factor of at least 1.1, at least 1.25, at least 1.5, at least 1.7, or at least 2.

According to still further features in the described preferred embodiments, the mounting assembly includes a locking arrangement adapted to fix the workpiece with respect to the mounting assembly.

According to still further features in the described preferred embodiments, the aqueous medium includes ethylene glycol.

According to still further features in the described preferred embodiments, the scraping element, the spring assembly and the workpiece are disposed and adapted, whereby, under operating conditions, or even when operating in air or under a substantially pure nitrogen environment, at least 30%, at least 40%, or at least 50% of the particles liberated from the aluminum-containing workpiece are elongated particles having orthogonal dimensions x, y, and z, the elongated particles characterized by a dimensionless shape parameter S defined by $$S = x \cdot y / (z^2),$$

wherein S is at least 10, at least 20, at least 30, at least 40, at least 50, at least 60, or at least 80.

According to still further features in the described preferred embodiments, the scraping element, the spring assembly and the workpiece are disposed and adapted, whereby, under operating conditions, or even when operating in air or under a substantially pure nitrogen environment, the particles liberated from the aluminum-containing workpiece are, on a statistical weight basis, elongated particles having orthogonal dimensions x, y, and z, the elongated particles characterized by a dimensionless shape parameter S defined by $$S = x \cdot y / (z^2),$$

wherein S is at least 10, at least 20, at least 30, at least 40, at least 50, at least 60, or at least 80.

According to still further features in the described preferred embodiments, the scraping element, the spring assembly and the workpiece are disposed and adapted, whereby, under operating conditions, the particles liberated from the aluminum-containing workpiece, after an average residence time of 5 to 10 minutes within the aqueous medium, and after dewatering under a substantially pure nitrogen environment, have, on an average weight basis, an average oxygen to aluminum weight ratio of at least 0.15, at least 0.20, at least 0.25, at least 0.30 or at least 0.35.

According to still further features in the described preferred embodiments, the surface and the mechanism are further adapted whereby the relative motion is manually effected.

According to still further features in the described preferred embodiments, the surface and the mechanism are further adapted whereby the relative motion is manually effected by human fingers, hand or foot.

According to still further features in the described preferred embodiments, the reaction chamber includes a flexible wall, wherein, in a relaxed condition of the wall, the scraping element is substantially stationary with respect to the working surface, and wherein the operating condition is achieved by flexing the wall, whereby the scraping element scrapes against the working surface to effect the liberation of particles.

According to still further features in the described preferred embodiments, the apparatus further includes a membrane adapted and disposed to inhibit water from exiting the reaction chamber via the discharge port, the membrane further adapted and disposed whereby, under operating conditions, the hydrogen gas flows through the membrane and out of the chamber.

According to still further features in the described preferred embodiments, the apparatus further includes a second membrane adapted to provide a substantially hermetical seal to the reaction chamber, and a protruding element, disposed and adapted to puncture, on demand, the second membrane, to enable the hydrogen gas to flow out of the reaction chamber.

According to still further features in the described preferred embodiments, the apparatus further includes a cooling system associated with the reaction chamber.

According to still further features in the described preferred embodiments, the cooling system includes a coolant circulation system adapted to circulate a coolant past a wall of the reaction chamber.

According to still further features in the described preferred embodiments, the cooling system includes a coolant circulation system adapted to effect a circulation of water within the reaction chamber to effect direct cooling of the chamber.

According to still further features in the described preferred embodiments, the circulation of water within the reaction chamber is adapted to remove spent particles from the chamber.

According to still further features in the described preferred embodiments, the apparatus further includes a filter or particle collection chamber adapted to collect spent particles from the reaction chamber.

According to still further features in the described preferred embodiments, the aluminum-containing material is an aluminum alloy typically containing at least 30%, at least 50%, at least 60%, at least 75%, at least 85%, or at least 90% aluminum, by weight.

According to still further features in the described preferred embodiments, the aluminum-containing material is an aluminum-based material.

According to still further features in the described preferred embodiments, the aluminum-containing material consists essentially of aluminum.

According to still further features in the described preferred embodiments, the apparatus further includes a fuel cell adapted to receive the hydrogen gas and to produce water and energy from the hydrogen gas.

According to still further features in the described preferred embodiments, the cylinder is a replaceable cylinder adapted to be reversibly and detachably inserted and removed from the mounting assembly.

According to still further features in the described preferred embodiments, the apparatus further includes a second membrane adapted to provide a complete or hermetical seal to the reaction chamber, until the second membrane is punctured by a protruding or pin-like device associated with, or integral with, the connector to a device into which the hydrogen is to flow.

According to still further features in the described preferred embodiments, the flexible wall includes a bellows or accordion-type arrangement.

According to still further features in the described preferred embodiments, the apparatus further includes a stop or limiter, disposed within the reaction chamber, to keep a spring-loaded device from expanding beyond a particular or pre-determined limit.

According to still further features in the described preferred embodiments, the space above an initial water charge within the chamber is filled with a gas, preferably hydrogen, to provide flexibility during initial operation of the apparatus.

According to still further features in the described preferred embodiments, the apparatus further includes an arrangement for recycling water, produced in a connected fuel cell, back into the reaction chamber.

According to still further features in the described preferred embodiments, the method further includes recycling the at least one aluminum compound to produce aluminum.

According to still further features in the described preferred embodiments, the method further includes reacting the hydrogen gas to produce water and energy, for example, in a fuel cell.

According to still further features in the described preferred embodiments, the aqueous medium includes a material selected to lower a freezing point of the medium.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 2b provides a schematic, side cross-sectional view of a portion of the sub-arrangement provided in FIG. 2a, wherein:

FIG. 2b (i) shows the aluminum cylinder in an initial, unconsumed state, and FIG. 2b (ii) shows the cylinder in a partially consumed state;

FIG. 5b provides a schematic, cutaway top view of the portable, hydrogen generating apparatus of FIG. 5a;

FIG. 7b provides a side view of the arrangement of FIG. 7a;

DESCRIPTION OF THE PREFERRED EMBODIMENTS

Figure 1:
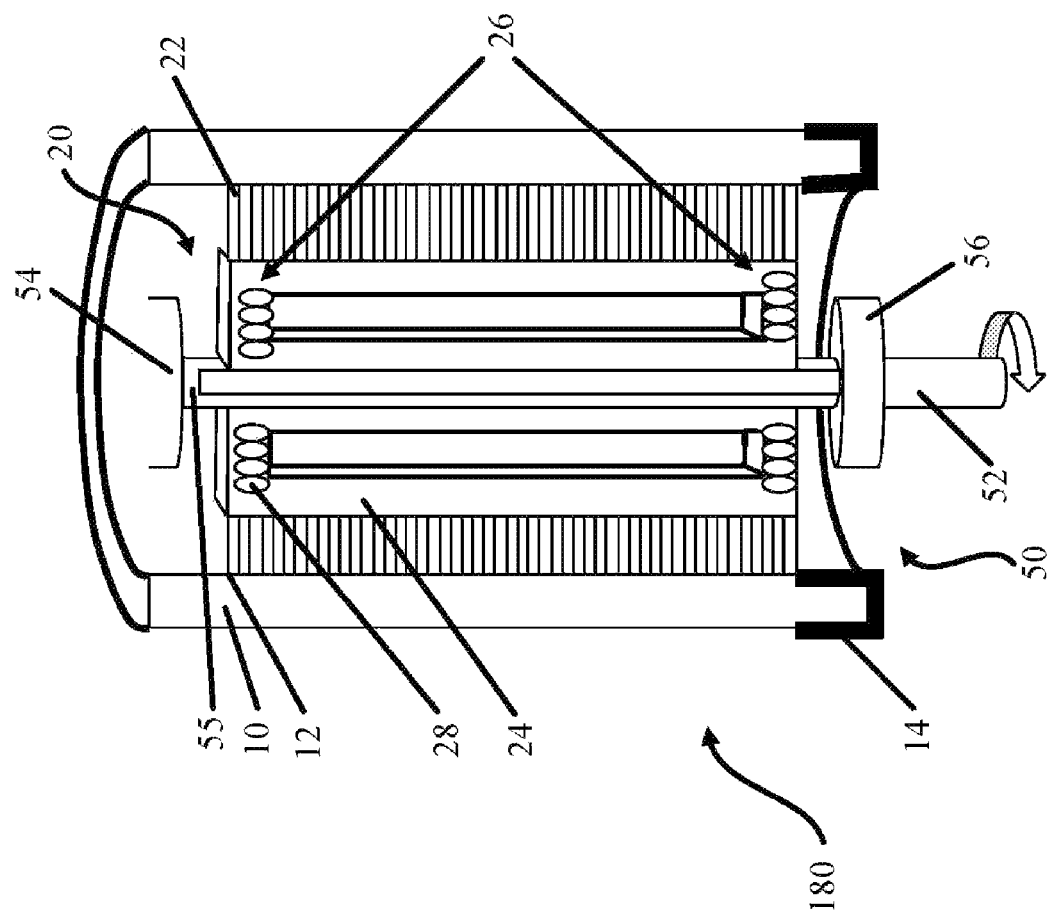
FIG. 1 provides a schematic, partly cross-sectional view of a portion of a sub-arrangement of a hydrogen generating system of the present invention.

The principles and operation of the hydrogen generating system and method of the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

FIG. 1 provides a schematic, partly cross-sectional view of a portion of a sub-arrangement 180 of a hydrogen generating system, according to a first embodiment of the present invention. An aluminum metal based workpiece, such as hollow cylinder 10, is disposed around a scraping assembly 20 having at least one scraping element 22 adapted to contact a working surface 12 of cylinder 10. Scraping element 22 may typically be a large plurality of bristles or wires, usually made of a metal such as a stainless steel. Scraping element 22 may be attached to a drive arrangement 50 by means of a frame 24. Scraping assembly 20 may include a spring assembly 26 having at least one spring 28, assembly 26 and spring 28 adapted to exert a substantially radial force on scraping element 22, whereby scraping element 22 is urged against working surface 12.

Drive arrangement 50 may include a motor or other drive means (shown in FIG. 3), a drive or rotating shaft 52, which may have a bearing and a shaft holder 54 connected, at an end distal to drive shaft 52, to a rotating shaft 55 disposed substantially parallel to a longitudinal axis of cylinder 10. At the end of rotating shaft 55 proximal to drive shaft 52, may be disposed a shaft bearing and anchor 56.

Cylinder 10 may be held in place with respect to scraping assembly 20 by means of a holder or clamp 14. Thus, cylinder 10 and scraping assembly 20 are adapted to move in a relative motion, whereby, scraping element 22 scrapes against working surface 12 to effect a liberation of fine aluminum-containing particles from working surface 12.

Cylinder 10 may typically be sealed by means of a conventional sealing arrangement that will be apparent to those of ordinary skill in the art. However, such a sealing arrangement may be obviated by the use of a magnet arrangement in which a changing external magnetic field may induce a relative motion between a scraping assembly such as assembly 20 and a workpiece such as cylinder 10. Various rotating feedthrough arrangements may also be apparent to those of ordinary skill in the art.

Scraping of various reaction products formed on metal surfaces is known in the field of high vacuum pumping devices. U.S. Pat. No. 3,443,742 to Hirsch, which is incorporated by reference for all purposes as if fully set forth herein, discloses a vacuum pump in which the gases react with a metal collector surface such as titanium, forming a reaction product on the surface. A brush is employed to expose fresh collector surface.

U.S. Pat. No. 3,443,742 directs the invention to pumping devices, and more particularly, to pumping devices which may be used to eliminate gases in a high-vacuum system. Typically, such systems employ a vacuum of $10^{-2}$ torr to $10^{-8}$ torr. The pumping device is not intended for use in pressures exceeding $10^{-2}$ torr.

By sharp contrast, the present invention relates to hydrogen production systems in which hydrogen is produced by reaction of aluminum metal with water. The reaction is between water and aluminum, in a reactor immersed in an aqueous medium, and is not in any way a metal-gas reaction.

Perhaps more significantly, the object of the reactions contemplated by U.S. Pat. No. 3,443,742 is to eliminate gas from the vessel by reacting the gas with the metal surface. By sharp contrast, the present invention is directed towards the production of hydrogen gas.

As opposed to the deep vacuum employed by U.S. Pat. No. 3,443,742, the present invention operates at superatmospheric pressure, often at pressures of at least 2 or 3 atmospheres (absolute). Under such conditions, the specific hydrogen production rate (liters per unit surface area of aluminum surface) may be quite high, and the dissipation of the hydrogen gas away from the metal surface, past the brush, and through the aqueous medium, represent technical criteria that were not relevant to the solution provided by U.S. Pat. No. 3,443,742.

In addition, unlike in the disclosed pumping device, hydrogen production systems must be highly energy efficient to be economical, requiring a low energy input per energy value (hydrogen gas) produced.

Many of these issues will be developed hereinbelow, over the course of the description, or will be evident therefrom.

Figure 2A:
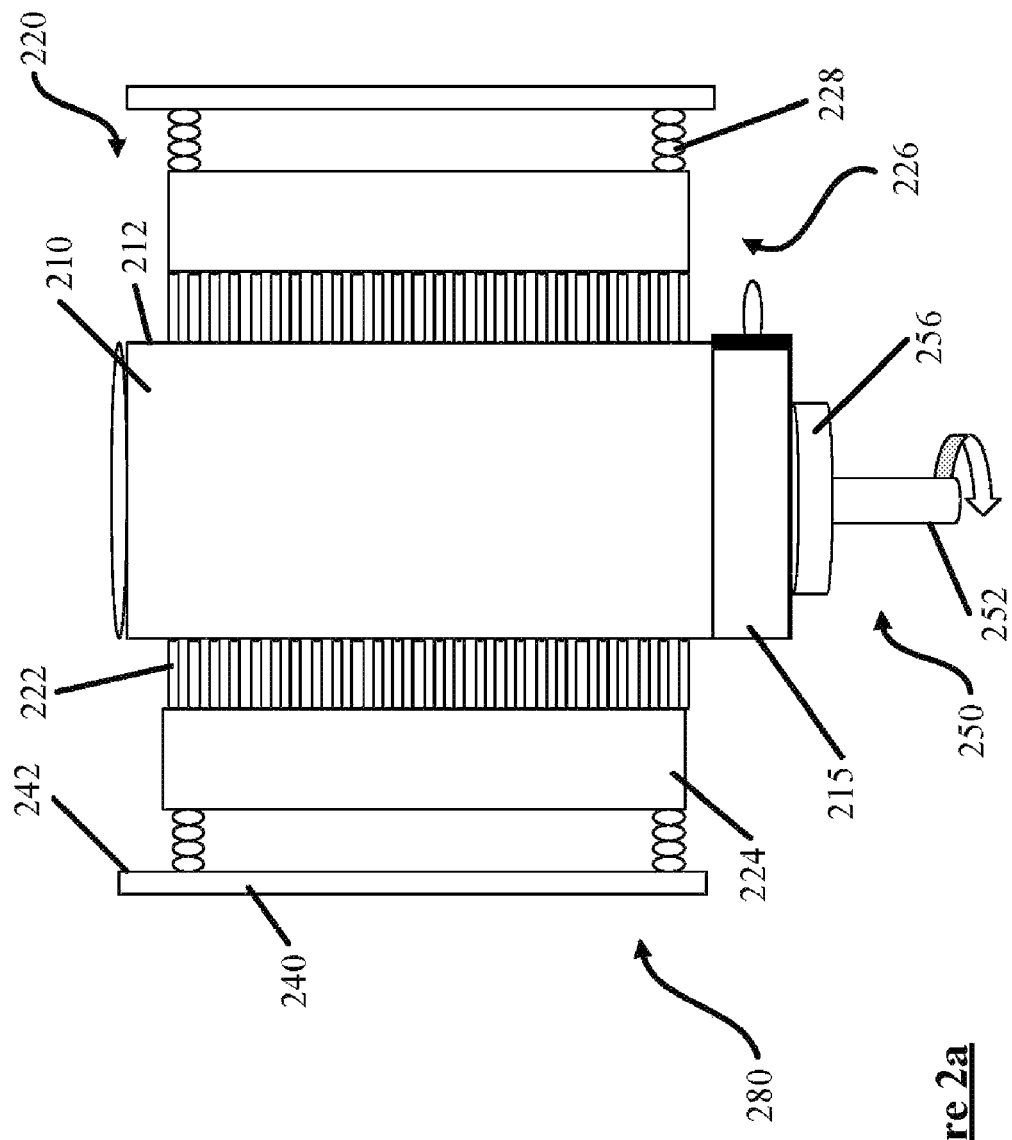
FIG. 2a provides a schematic, partly cross-sectional view of a portion of another sub-arrangement of the inventive hydrogen generating system.

FIG. 2a provides a schematic, partly cross-sectional view of a portion of a sub-arrangement 280 of a hydrogen generating system, according to another embodiment of the present invention. An aluminum metal based workpiece, such as cylinder 210, is disposed radially within a scraping assembly 220 having at least one scraping element 222 adapted to contact a working surface 212 (in this case, an outer working surface) of cylinder 210. Scraping element 222 may typically be a large plurality of bristles or wires, substantially as described hereinabove. Scraping assembly 220 may include a spring assembly 226 having at least one spring 228, and a frame, backing or support 224, which may be adapted to hold in place scraping element 222. Spring assembly 226 may be braced, in an outward or outwardly radial direction by an internal wall 242 of a housing 240 at least partially enveloping scraping assembly 220 and cylinder 210. Consequently, spring assembly 226 and spring 228 may be adapted to exert a substantially inward or inwardly radial force on scraping element 222, typically via frame, backing or support 224, whereby scraping element 222 is urged against working surface 212.

Cylinder 210 may be connected to a drive arrangement 250 by means of a cylinder seating or receptacle 215. Drive arrangement 250 may include a motor or other drive means (shown in FIG. 3), a drive or rotating shaft 252, which may have a shaft bearing and anchor 256.

In this embodiment, cylinder 210 rotates with respect to scraping assembly 220, which is typically fixed. The relative motion between cylinder 210 and scraping assembly 220 causes scraping element 222 to scrape against working surface 212 to effect a liberation of fine aluminum-containing particles from working surface 212.

A pressuring arrangement may be used to juxtapose the scraping mechanism to the receding surface of the aluminum. The magnitude of the pressure may be adapted to the brush or comb assembly. The angle of the bristles and the density of the bristles may also be adapted for optimum performance. The pressure on the brush assembly can also be adapted to the particular metallurgical characteristics of the aluminum.

We have found that the pressure on the brush must be sufficient to scrape off the alumina on one hand, and on the other hand must be light enough to only scrape off a minimal amount of aluminum to expose a fresh aluminum surface and to provide small aluminum particles to interact efficiently and directly with water.

The aluminum workpiece may be of various thicknesses, depending on the nature of the application. The thickness may vary from less than one centimeter to tens of centimeters, but thinner or thicker walls are possible. As the reactions take place, the wall of the aluminum cylinder gradually and substantially uniformly recedes. Indeed, the uniform reduction of aluminum is one of the key advantages of the cylindrical embodiment of this invention. Throughout this recession, whether the recession takes place in several different start and stop scraping sessions or in one long continuous scraping session, the pressuring arrangement maintains optimum contact between the aluminum surface of the workpiece and the scraper as the aluminum face recedes by at least the thickness of the alumina layer, and more preferably, by at least the thickness of the alumina layer plus an additional atomic layer of aluminum. The scraping mechanism is preferably adapted to remove primarily the alumina or oxidized aluminum layer, along with a thin layer of pure aluminum disposed thereunder. Such an arrangement uses significantly less energy to run, and maximizes the lifespan and utilization of the aluminum workpiece.

Various springs and spring assemblies may be contemplated for use in conjunction with the hydrogen generation system of the present invention. For example, a single spring may be positioned above the brush assembly, pushing down on a lever assembly attached to the brushes, whereby the ends of the brush or wires are urged against the surface of the aluminum workpiece. In another exemplary arrangement, leaf springs may be mounted on each brush assembly between the shaft and the brush, pushing the brush out one leaf spring per brush. Various other embodiments may be apparent to those of ordinary skill in the art.

The embodiment provided in FIG. 1 may produce a vortex, which represents wasted mechanical energy, and reduces the net energy produced by the system.

We have discovered, however, that the embodiment provided in FIG. 2 has reduced drag forces, producing a reduced vortex (or substantially no vortex), thereby appreciably improving the net energy produced by the system. Moreover, the improved energy efficiency may be achieved without reducing the production rate of hydrogen gas, and without reducing the aluminum utilization.

The prior art generally teaches that the production or use of extremely fine aluminum particles is highly advantageous. If the particles have a characteristically high average particle size, the aluminum in the particles does not quickly and completely react with the water to form hydrogen. Thus, large particles are underutilized, and may result in low production rates of hydrogen per unit surface area of the aluminum workpiece.

Grinding and other mechanical processes may create relatively large particles and may have characteristically less control of particle uniformity. Consequently, such processes may make poor utilization of the aluminum for hydrogen production. Additional grinding steps of at least a portion of the ground material may be disadvantageously required.

Milling may not be suitable to in-situ production of hydrogen gas, particularly for applications requiring compact and/or portable apparatus. In addition, there may be attrition on the inner workings of the milling chamber, due to aggressive contact between the rods, balls, etc., with alumina (having a hardness of about 8.5 on the Mohs scale) disposed on the surface of the workpieces.

We have found that producing extremely fine particles, as taught by the prior art, may be counterproductive to the energy efficiency of the hydrogen generation system, requiring various energy-intensive mechanical processing steps. We have further found, surprisingly, that the liberation of elongated particles from the aluminum workpiece surface may provide the requisite surface area for elevated production rates of hydrogen, coupled with high utilization of the aluminum material and relatively low energy input per energy value (or unit of hydrogen) produced. Preferably, the scraping element, spring assembly and aluminum workpiece are disposed and adapted, whereby, under operating conditions, the particles liberated from the aluminum-containing workpiece include elongated particles having orthogonal dimensions x, y, and z, the elongated particles characterized by a dimensionless shape parameter S defined by $$S = x \cdot y / (z^2),$$

wherein S is at least 10, at least 20, at least 30, at least 40, at least 50, at least 60, or at least 80. By way of example, a cubic particle having a characteristic length of 3 micrometers ($\mu$) has a dimensionless shape parameter (S) equal to 1. By sharp contrast, a particle produced by the system and method of the present invention may have dimensions of $25\mu \cdot 25\mu \cdot 3\mu$ has a dimensionless shape parameter (S) equal to about 69.

Preferably, at least 30% of the particles liberated from the aluminum-containing workpiece, and more preferably, at least 50% of the particles, are characterized by an S of at least 20.

On a statistical weight basis, the elongated particles are preferably characterized by an S of at least 10, at least 20, at least 30, at least 40, at least 50, at least 60, or at least 80.

Alternatively or preferably additionally, the smallest of the three characteristic (orthogonal) dimensions may advantageously be less than $10\mu$, less than $7\mu$, less than $5\mu$, less than $4\mu$, or less than $3\mu$, in order to achieve extremely high utilization of the aluminum metal.

By way of example, we compare an aluminum powder having a uniform (cubic) particle size of $20\mu \cdot 20\mu \cdot 20\mu$ with an aluminum powder produced according to the present invention, having a uniform particle size of $80\mu \cdot 25\mu \cdot 4\mu$. The volume of the particles in each powder is identical ($8000\mu^3$). However, the surface area per particle is quite different: $2400\mu^2$ for the cubic material vs. $4840\mu^2$ for the material of the present invention.

Moreover, if we assume the reaction depth of the water with the aluminum metal surface to be $1.5\mu$ on a side, the utilization of the cubic aluminum particles is calculated to be 38.6%; the utilization of the elongated aluminum particles is calculated to be 78.8%. If we assume the reaction depth of the water with the aluminum metal surface to be $2\mu$, the utilization of the cubic aluminum particles is calculated to be 48.8%; the utilization of the elongated aluminum particles of the present invention is calculated to be 100%.

An advantage of the invention compared to various other mechanical abrasion techniques is that the system ultimately converts a large fraction of the aluminum to reacted aluminum in a controlled, safe manner, thereby maximizing the hydrogen output potential of the aluminum. In some embodiments the efficiency of aluminum conversion to reacted product is very important. Unreacted aluminum may be less than 50% by weight (of the initial weight of the aluminum), preferably less than 40%, more preferably, less than 30%. In some cases, more than 90% or even more than 95% of the original aluminum is reacted (corresponding to less than 10% or less than 5% unreacted aluminum), releasing near the maximum amount of hydrogen possible.

Another advantage is that the mechanical energy is applied almost totally to the surface of the aluminum, therefore requiring less energy than alternative mechanical approaches in which mechanical energy is less well utilized. The oxidized aluminum is relatively easily scraped off so there is little or no attrition to the scraper. The scraper may be made of a hard material, so its attenuation (wear) is minimized.

FIG. 2b provides a schematic, side cross-sectional view of a portion of the sub-arrangement provided in FIG. 2a, wherein FIG. 2b(i) shows aluminum-based workpiece or cylinder 210 in an initial, unconsumed state, having a radius $R_0$, and FIG. 2b (ii) shows cylinder 210 in a partially consumed state, having a radius $R_1$. Cylinder 210, as shown, is radially enveloped or surrounded by scraping assembly 220. Scraping assembly 220 includes a plurality of spring assemblies, spring assembly 226 having at least one spring 228, and a frame, backing or support 224, which may be adapted to hold in place scraping element 222 against working surface 212 of cylinder 210. Spring assembly 226 may be braced, in an outward or outwardly radial direction by internal wall 242 of housing 240, which completely envelops or at least partially envelops scraping assembly 220 and cylinder 210. Consequently, spring assembly 226 and spring 228 may be adapted to exert a substantially inward or inwardly radial force on scraping element 222, typically via support 224, whereby scraping element 222 is urged against working surface 212.

The arrangement may be designed and adapted whereby, in the initial, unconsumed state, a distance $D_0$ is maintained between adjacent scraping elements 222, along working surface 212, as shown in FIG. 2b(i), and whereby in the partially consumed state, a distance $D_1$ ($D_1 \geqq 0$) still exists between these adjacent scraping elements 222, along working surface 212, as shown in FIG. 2b (ii). Importantly, this arrangement, in which distance $D_1$ remains non-negative, holds for a wide range of ratios of $R_1$ to $R_0$, ($R_1/R_0$) typically within a ratio of at least 0.6 to 1, at least 0.5 to 1, or at least 0.4 to 1 to 1 to 1.

Figure 3:
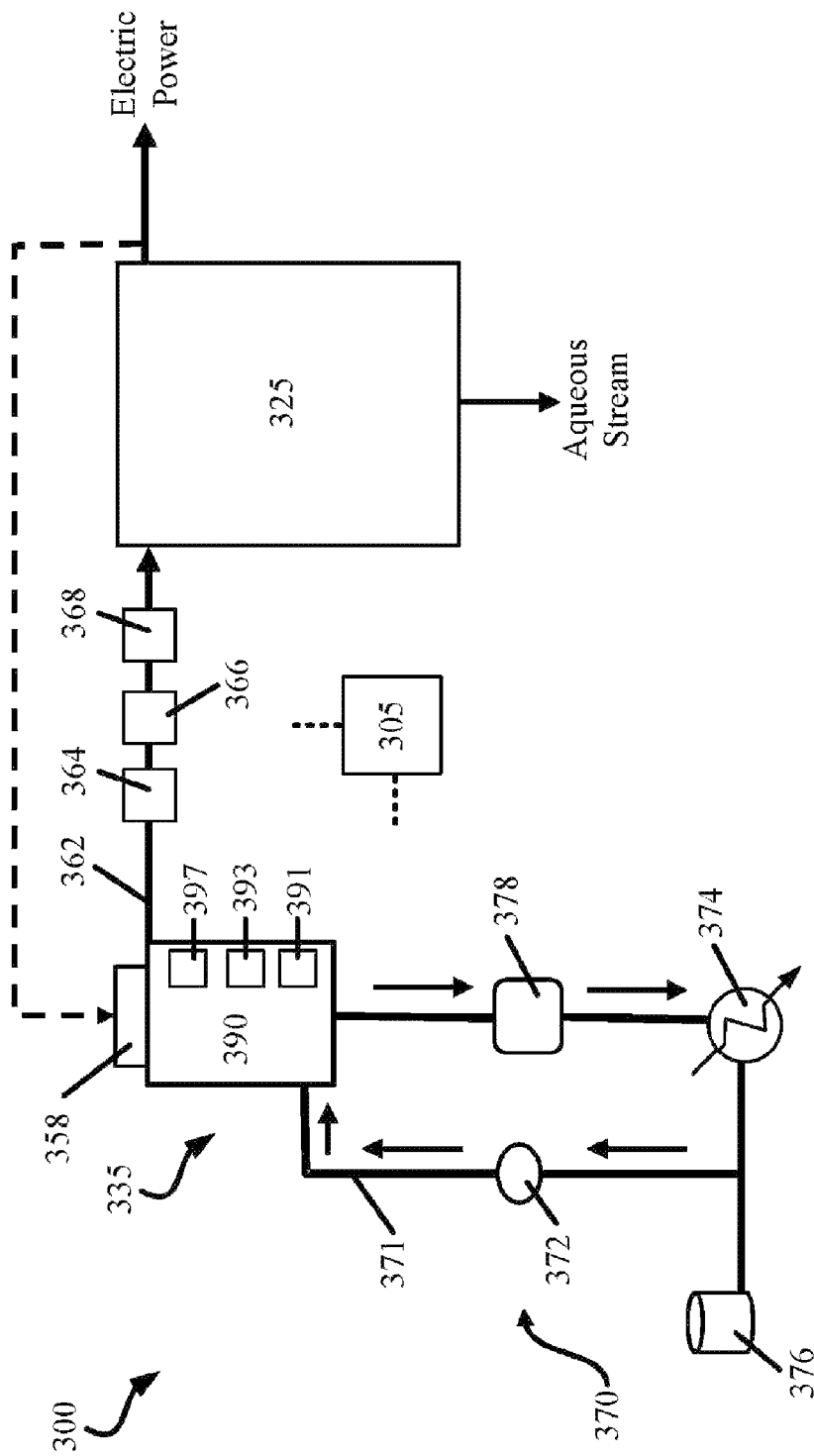
FIG. 3 is a schematic block diagram of a hydrogen generating system attached to a hydrogen-consuming fuel cell arrangement, according to another embodiment of the present invention.

FIG. 3 provides a schematic block diagram of a hydrogen generating and power producing system 300, according to another embodiment of the present invention. Within a hydrogen generating system 335 within system 300, an assembly containing the aluminum energy source and the scraping assembly, such as sub-arrangement 280 (shown in FIG. 2a), is disposed within a gas-tight reactor or hydrogen generating apparatus 390, which may be at least partially or fully filled with water or an aqueous medium. A motor or drive means 358 for achieving the above-described relative motion is preferably disposed adjacent to reactor 390. Hydrogen gas evolving during the aluminum-water reaction is discharged from reactor 390, via a hydrogen outlet line 362. The gas may be filtered by means of an on-line filter or membrane 364, whereby hydrogen gas passes through filter 364, but other species, such as water vapor, do not. Hydrogen outlet line 362 may be further equipped with a pressure regulator 366, which may be adapted and set to enable a particular or pre-determined pressure to be built up within reactor 390. The pressure set point may be fixed according to the downstream destination of the hydrogen gas, but may be within the range of 1.2 to 10 atmospheres (absolute) for a wide variety of applications. In the specific embodiment provided by way of example in FIG. 3, the downstream destination of the hydrogen gas is an electricity-producing unit such as a fuel cell stack 325.

Pressure regulation and hydrogen flow may be controlled by means of pressure regulator 366, which may be solely mechanical (such as an orifice in hydrogen outlet line 362) or may be a control valve in the discharge line, the control valve responsive to a controller, such as controller 305 described in greater detail hereinbelow.

Motor or drive means 358 may be powered by a power source external to hydrogen generating system 335. Alternatively, when the hydrogen produced is converted to electricity by a power or electricity-producing unit such as fuel cell stack 325, electric power may be provided to motor 358 from the electric power generated within system 300, in fuel cell stack 325.

Optionally, an additional hydrogen accumulation tank 368 may be installed as part of the inventive apparatus. Tank 368 may fluidly connect with hydrogen generation system 335 to receive hydrogen gas. Hydrogen accumulation tank 368 may be adapted to discharge stored gas during peak consumption periods or in response to other particular needs. Tank 368 may have one or more hydrogen sensors connected to the controller unit, and may be used as a direct feed into the desired hydrogen output use, such as a fuel cell stack 325.

A cooling system such as a circulating cooling system 370 may advantageously be associated with reactor 390. Cooling system 370 may include a circulation line 371, circulation means such as a circulation pump 372, fluidly communicating with line 371, and a cooling unit 374, fluidly communicating with line 371, and adapted to discharge heat to the environment. A makeup water reservoir 376 may advantageously be connected to circulation line 371.

It may also be advantageous to dispose a filtration unit such as filter 378 on line 371, for example, on the water outlet side, as shown.

The system or apparatus of the present invention may include an aluminum thickness sensor 391 associated with the aluminum cylinder for sensing the extent of the aluminum consumption, or when a cylinder requires replacement. Sensor 391 may be a simple mechanical device or it may be electronic and be connected to a controller unit, such as controller 305. Controller 305 may be configured to notify an operator that the aluminum source requires replenishing.

Controller 305 may contain a processor that processes input from one or more of the following: 1) one or more hydrogen pressure sensors 393 that may be located in one or all of the following: within reactor 390, in/near fuel cell 325, in hydrogen outlet line 362, and in the feeder and/or storage tank (not shown); 2) aluminum thickness sensor 391; 3) a water level sensor 397 associated with, or disposed in, reactor 390; 4) a controller adapted to control the rotational speed, e.g., for increasing or decreasing hydrogen output, and 5) an input to receive a user power increase or decrease request. Controller 305 may be configured to inform an operator to replace the aluminum cylinder, or of any fault condition. Controller 305 may be further configured to inform the operator of the need to replace the brush assembly based on hydrogen production levels calculated against the wear rate of the aluminum workpiece.

Figure 4:
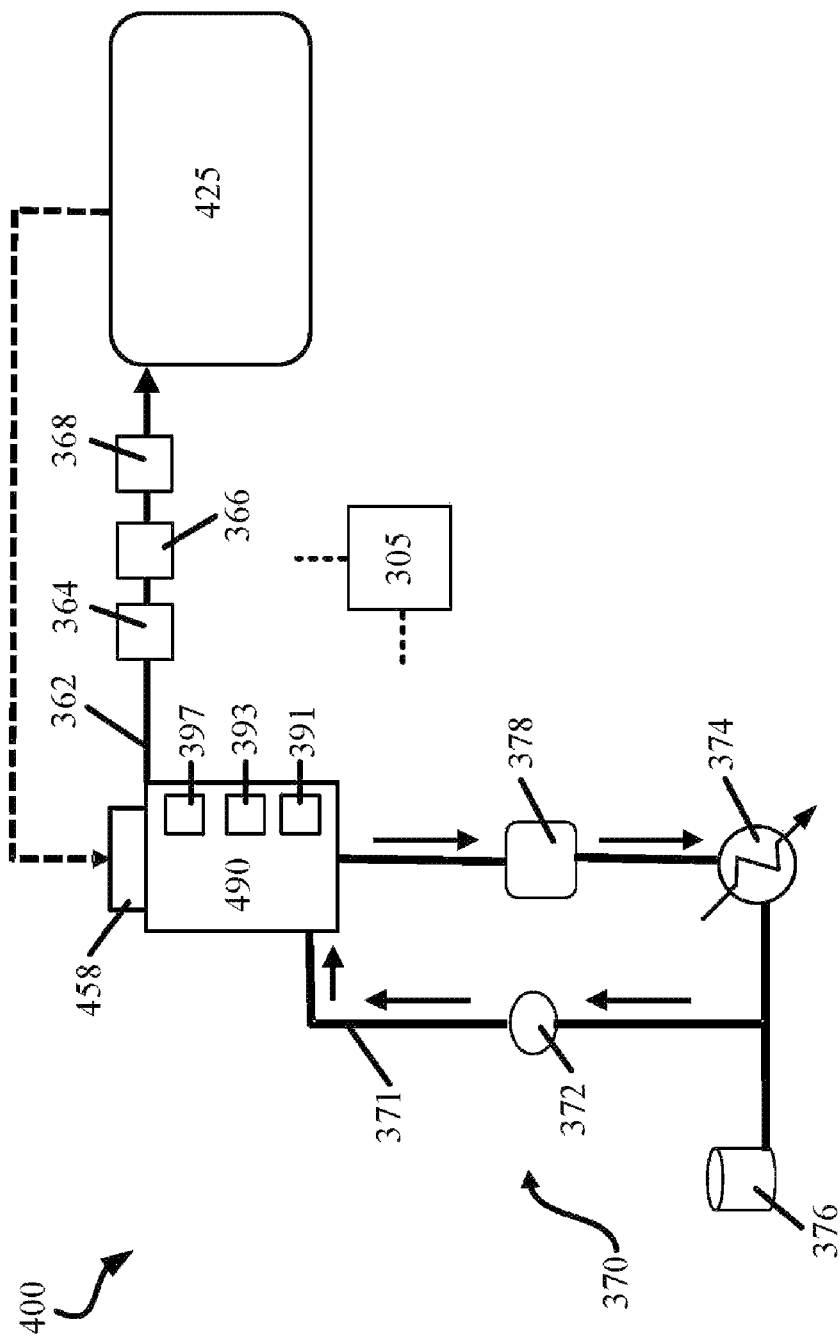
FIG. 4 is a schematic block diagram of an inventive hydrogen generating system, attached to a hydrogen-consuming combustion system such as an internal combustion engine.

FIG. 4 provides a schematic block diagram of a hydrogen generating and power producing system 400, according to another embodiment of the present invention. System 400 is largely similar to system 300 of FIG. 3, but the hydrogen produced in hydrogen generating system 400, is combusted in a power producing unit such as a combustor 425. One potentially advantageous arrangement is to feed the generated hydrogen gas as a supplemental fuel stream to an internal combustion engine. In this case, motor or drive means 458 may be powered from electric power generated within the system surrounding combustor 425, or by rotational (mechanical) power from combustor 425.

While water is a reactant and a natural medium for effecting the reaction, we have found that, contrary to the teachings of U.S. Pat. No. 7,008,609 to Watanabe et al., various additives, solvents, etc. may be introduced. For example, freezing-point depression materials may be introduced to lower the freezing point of the aqueous medium. Upon the addition of ethylene glycol to the aqueous medium, no decrease in the hydrogen production rate was observed.

In many applications, hydrogen production systems like those of the present invention must be highly energy efficient to be economical, requiring a low energy input per energy value (hydrogen gas) produced. Energy losses may include heat losses, mechanical losses including drag forces in the aqueous medium, and energy spent in exposing fresh aluminum surface and producing aluminum particles.

We have found that high rotational speeds may lower the energy efficiency of the hydrogen generation system. We have further found that by utilizing a high coverage ratio (i.e., the area ratio of abrasive material such as wire to the nominal surface area of the aluminum workpiece), the decreased rate of hydrogen production at low rotational speeds may be compensated.

We have further found that the above holds true within a certain range of coverage ratios. Beyond this range, the rate of hydrogen production may level off or even decrease. Without wishing to be bound by theory, we attribute this phenomenon to accumulation of alumina that is trapped at the surface by the densely packed scraping elements, and possibly by the limited or hampered diffusion of hydrogen gas at the workpiece surface. Within this certain range of coverage ratios, water contact with the aluminum may be sufficient for effecting reaction and for surface cooling of the aluminum block or workpiece.

Thus, while the brush may contain a dense array of bristles over a broad area, and the contact area is preferably at least 10%, 20%, 30%, 40%, or 50%, of the working surface, the contact area preferably should not exceed 95%, 90%, or 85% of the working surface.

We also believe that (with all other parameters being substantially maintained) the specific rate of hydrogen production, i.e., the rate of hydrogen production per unit surface area of the aluminum workpiece, may be appreciably enhanced in a surface area having a characteristically low grain size.

In yet another preferred embodiment, the apparatus of the present invention may be operated in a pulsed mode by starting the scraping action in a vacuum or under an inert gas. The accumulated aluminum particles may then be exposed to water, releasing hydrogen in a burst.

In one exemplary embodiment, the hydrogen fuel produced by the apparatus of the present invention may be added to a system of a conventional combustion engine to improve efficiency and/or reduce harmful emissions.

In yet another preferred embodiment, the top of the permanent casing unit has a lid that is sealed to contain hydrogen pressure and can be opened with a latch or other locking device. Brackets or another type of clamp hold the aluminum cylinder in place and prevent it from being moved by the scraper. The brushes and springs fit over a spindle or spindle-like holder. To remove and replace the aluminum cylinder or canister and optional devices to make removal of spent aluminum easier, the casing lid is opened and the securing mechanism holding the aluminum is opened.

The brush and spring assembly is not expected to suffer significant wear compared to the aluminum, such that it would be replaced less often than the aluminum cylinder. The assembly slides straight off the spindle. Water can be added directly into the cylinder unit and/or into a water-cooling unit and/or into a water reservoir unit.

A power unit may be connected to the controller unit that controls scraper and/or cylinder rotation. The power unit may consist of a battery, capacitor, or other energy storage device. Since the system may produce the desired hydrogen output immediately after scratching begins, the resulting hydrogen might be used to power the scraper almost instantly via electric power from a hydrogen-powered fuel cell. An external battery or capacitor can be used to start and operate the unit, depending on system design. The battery, capacitor, or other energy storage device can be recharged during normal operation.

As used herein in the specification and in the claims section that follows, the term "aluminum alloy" refers to any alloy in which aluminum has the highest content of any element present in the alloy, by weight. Similarly, the term "alloy", with respect to a particular metal (e.g., "aluminum alloy"), refers to any alloy in which that particular metal has the highest content, by weight, of any element present in the alloy.

As used herein in the specification and in the claims section that follows, the term "aluminum-containing material" refers to any alloy (or pure or substantially pure aluminum) in which the aluminum content exceeds 10%, and more typically, more than 20%, by weight. Similarly, the term "metal-containing material", with respect to a particular metal (e.g., "magnesium-containing material"), refers to any alloy (or pure or substantially pure metal) in which the content of that particular metal exceeds 10%, and more typically, at least 20%, by weight.

As used herein in the specification and in the claims section that follows, the term "aluminum-based material" refers to any material, including pure or substantially pure aluminum, in which the aluminum content exceeds 50% by weight. Similarly, the term "metal-based material", with respect to a particular metal (e.g., "magnesium-based material"), refers to any material in which the content of that particular metal exceeds 50%, by weight.

As used herein in the specification and in the claims section that follows, the term "reactive metal" and the like refers to a metal such as aluminum, titanium, magnesium, or other metal, or an alloy including such metals, which, upon contact with water, undergoes an oxidation reaction whereby hydrogen gas is liberated.

The present invention may have a wide variety of applications in electric power generation at various scales, including both very small applications (e.g., cell phones or laptop computers) and large applications (e.g., motor vehicle propulsion, portable civilian or military power). The present invention may be of particular value in applications in which either robust hydrogen and/or safe fuel delivery is particularly advantageous or required.

Figure 5A:
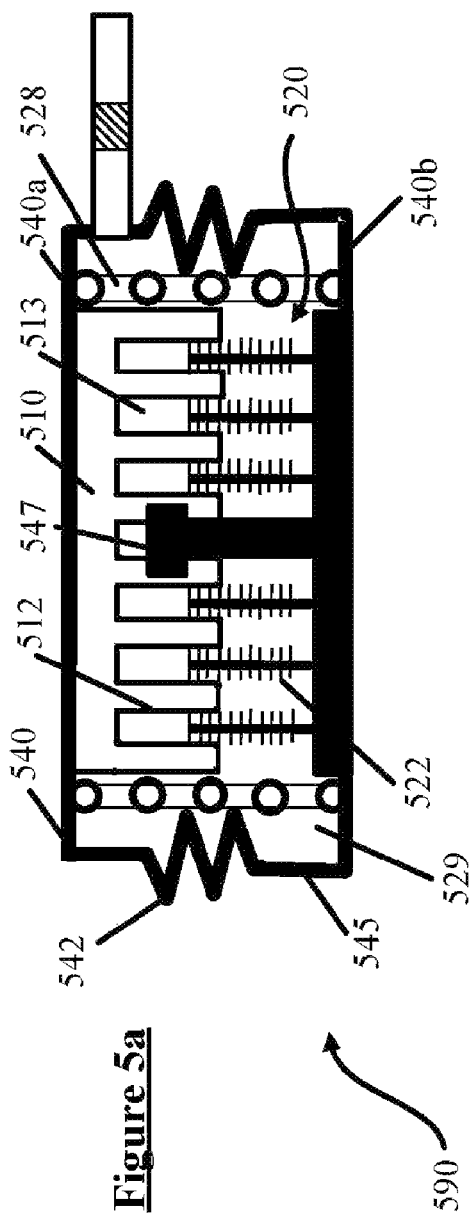
FIG. 5a provides a schematic, side cross-sectional view of a portable, manually-driven hydrogen generating apparatus, according to another aspect of the present invention.

FIG. 5a provides a schematic, side cross-sectional view of a typically portable, manually-driven hydrogen generating apparatus 590, according to another aspect of the present invention. A housing 540 may have the general size and shape of two dimes (such as plates or faces 540a, 540b), disposed one on top of the other, in a spaced-apart fashion (whereby apparatus 590 typically has a thickness of at least 7 mm). The space between faces 540a, 540b may be sealed, typically along a perimeter thereof, by means of a side wall 545 having a flexible element 542 such as a bellows (typically made of metal). Flexible element 542 may be adapted to provide flexibility in a direction generally orthogonal to faces 540a, 540b.

A chamber 529 within, and typically formed by, housing 540 may be partially filled with an aqueous medium such as water. It may be advantageous to leaving a space to facilitate brush movement. It may be of further advantage to fill this space with hydrogen gas, e.g., at atmospheric pressure.

Within manually-driven apparatus 590 is disposed an aluminum or aluminum-containing surface 512 of a workpiece such as a slotted aluminum-containing block 510, and an abrasive surface such as a plurality of wires 522 (typically having short bristles) of suitable hardness and density, disposed within a scraping assembly 520. Each slot 513 may be disposed and adapted to receive at least a portion of scraping assembly 520. One or more springs 528 disposed within manually-driven apparatus 590, and typically bridging between faces 540a, 540b, may be used to maintain the desired separation between the scraper and aluminum surface. A stopping element or mechanism 547 may be employed to limit the distance between faces 540a, 540b resulting from the extension of spring 528.

Thus, manually-driven apparatus 590 may be adapted whereby a pressure exerted on at least one, and typically both of faces 540a, 540b draws together faces 540a, 540b, whereby scraping assembly 520 and wires 522 move with respect to, and against surface 512. The newly exposed aluminum metal surfaces (on surface 512 and/or aluminum metal in particles liberated from surface 512) react with the water to produce a small quantity of hydrogen gas. Apparatus 590 may be connected to a miniature fuel cell or another electricity producing unit, as described hereinabove with respect to FIG. 3. This arrangement may be utilized to power portable electronic equipment such as cellular phones and the like. An occasional squeezing or pressing of hydrogen generating apparatus 590 may produce instant micropower requisite for a hydrogen fuel cell of the cellular phone or other portable electronic equipment.

Figure 5B:
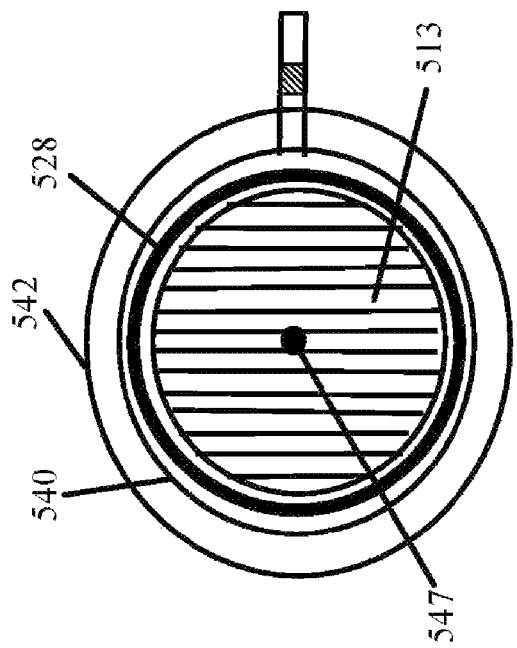

FIG. 5b provides a schematic, cutaway top view of the portable, hydrogen generating apparatus of FIG. 5a.

In the embodiment provided in FIGS. 5a and 5b, aluminum, water and the scraper assembly are contained in a single detachable, sealed unit. Hydrogen gas may be generated by one or more human fingers squeezing, sliding, or pushing the outside of the unit, causing the scraper to abrade an aluminum surface or surfaces. Any manual or automatic mechanical process could activate hydrogen production, including pressing the buttons of a cell phone, by way of example.

Apparatus 590 may be adapted to snap into a pre-provided opening in the fuel cell unit to be powered (which may be separated from, or integral with, a cellular phone or the like), by means of a fastening arrangement that may include clips or a perforated or slide-in casing design. Alternatively, apparatus 590 may be adapted to fit inside a standalone power unit in the same manner. An advantage of this approach is the continued utilization of the same fuel cell assembly after a particular aluminum cartridge has been exhausted.

When sufficient hydrogen pressure is built up in apparatus 590, the pressure may be felt by the operator during the squeezing of housing 540. This pressure indicates to the operator that an adequate hydrogen pressure has been achieved, so the operator knows to stop the squeezing or pumping operation. If the hydrogen pressure builds up excessively, the fingers will have increasing difficulty to pump the unit or may simply become incapable of pumping the unit.

Alternatively, excess hydrogen gas could be released from the device into the air or into a release chamber. Yet another alternative is to have a control lock mechanism to inhibit the operator from performing excessive squeezing or pumping.

Figure 6A:
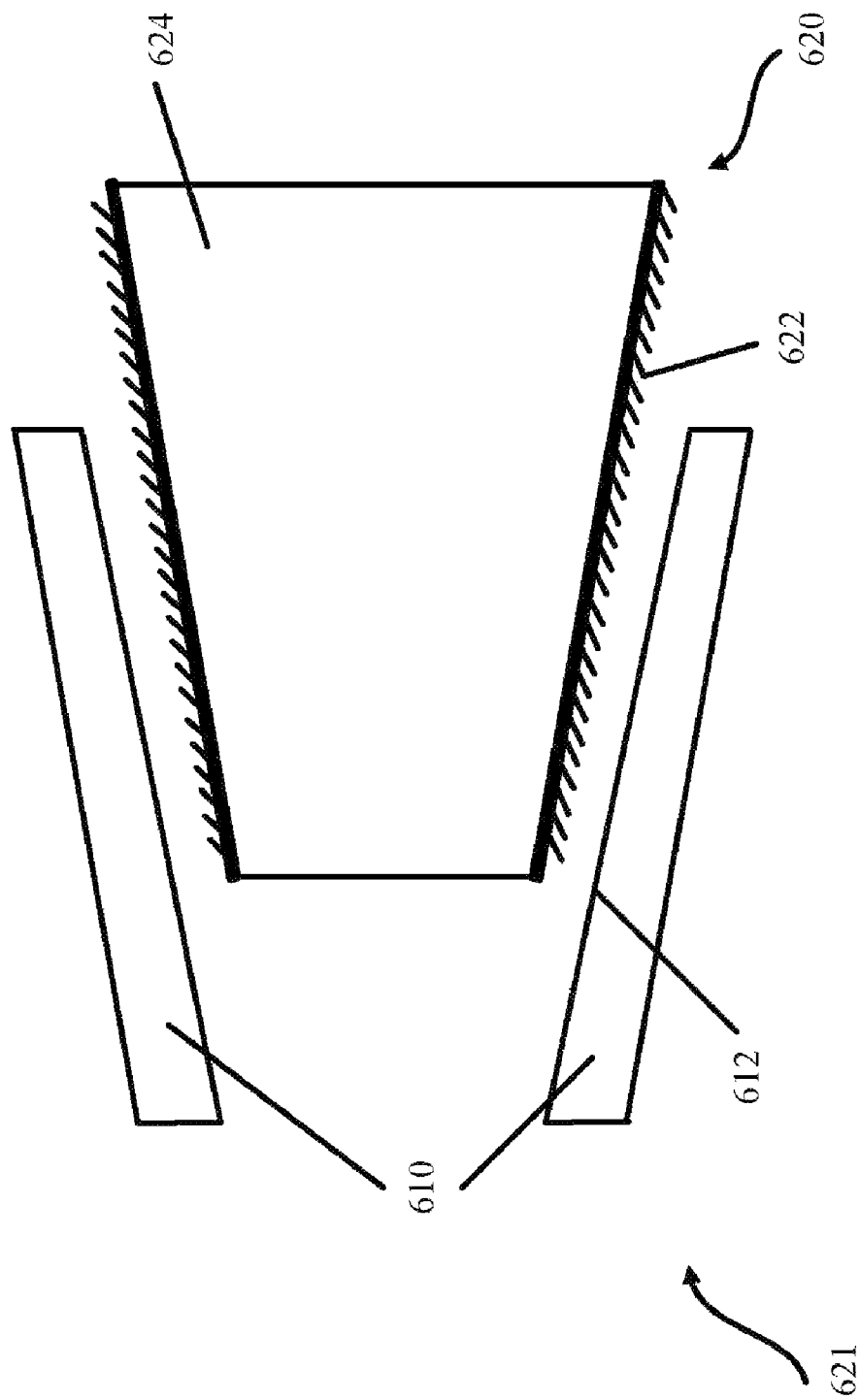
FIG. 6a provides a schematic, side cross-sectional view of a portion of a brush and sleeve arrangement according to another embodiment of the present invention.

FIG. 6a provides a schematic, side cross-sectional view of a portion of a brush and sleeve arrangement 621 according to another embodiment of the present invention. Within a manually-driven hydrogen generating apparatus such as manually-driven apparatus 590 (shown in FIG. 5a) is disposed an aluminum or aluminum-containing surface 612 of a workpiece such as a slotted aluminum-containing block 510 (shown in FIG. 5a) having generally conical slots or sleeves such as a sleeve 610. Brush and sleeve arrangement 621 may include an abrading assembly 620 including a base 624 surrounded by an abrasive surface such as a plurality of wires 622. Each sleeve 610 may be disposed and adapted to receive at least a portion of abrading assembly 620.

The mechanical action of abrading assembly 620 against surface 612 may be substantially similar to that of manually-driven apparatus 590, and may be effected by various means, including fingers, a hand or foot, and a mechanical cam device or the like.

Figure 6B:
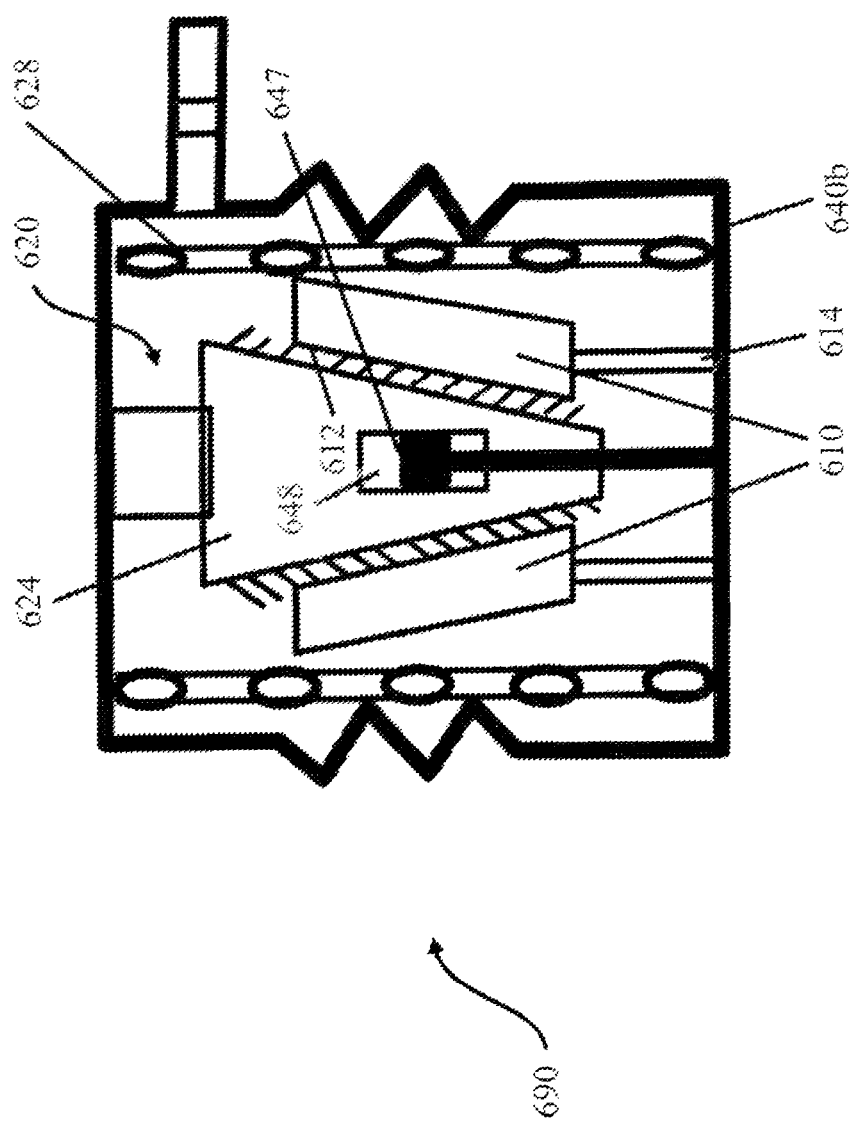
FIG. 6b shows a schematic cross-section of a hydrogen generating apparatus having an abrading assembly working against a surface of a generally conical aluminum sleeve.

The mechanical action of abrading assembly 620 against surface 612 of a generally conical slot or sleeve such as aluminum or aluminum-containing sleeve 610 may be effected in a hydrogen generating apparatus (typically manually-driven) such as apparatus 690, a schematic cross-section of which is provided in FIG. 6b. Sleeve 610 may be supported by at least one support 614, which may be mounted to a bottom face 640b of apparatus 690.

One or more springs 628 disposed within apparatus 690, and typically bridging between faces 640a, 640b, may be used to maintain the desired separation between the scraper and aluminum surface. A stopping element or mechanism 647 may be employed to limit the distance between faces 640a, 640b resulting from the extension of spring 628. Stopping element or mechanism 647 may be advantageously disposed within a slot 648, which determines the vertical travel limits of conical brush 624 or abrading assembly 620 with respect to surface 612 of sleeve 610.

The inventive apparatus may be powered by various powering arrangements. As described hereinabove with respect to FIG. 3, motor or drive means 358 may be powered by a power source external to the hydrogen generating system. It may be of particular advantage to adapt the inventive apparatus to be powered by available, harnessable power sources. By way of example, and as schematically provided in FIGS. 7a and 7b, an existing rotating arrangement such as a pulley and belt arrangement 758 may be used. Automobiles or other powered vehicles may have such pulley and belt arrangements. FIG. 7a provides a perspective view of an exemplary pulley and belt arrangement 758. The arrangement may include pulleys such as pulleys 759, and a moving or rotating belt 759a. Various hydrogen generating apparatus and sub-arrangements (such as sub-arrangement 180 described hereinabove) may be adapted to be integrated with pulley and belt arrangement 758, whereby rotating belt 759a directly or indirectly engages a shaft such as drive shaft 52 of hydrogen generating sub-arrangement 180.

Figure 7B:
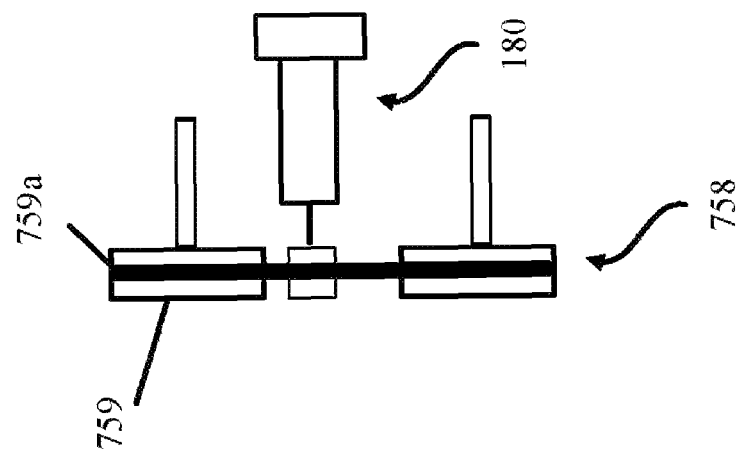
Figure 7A:
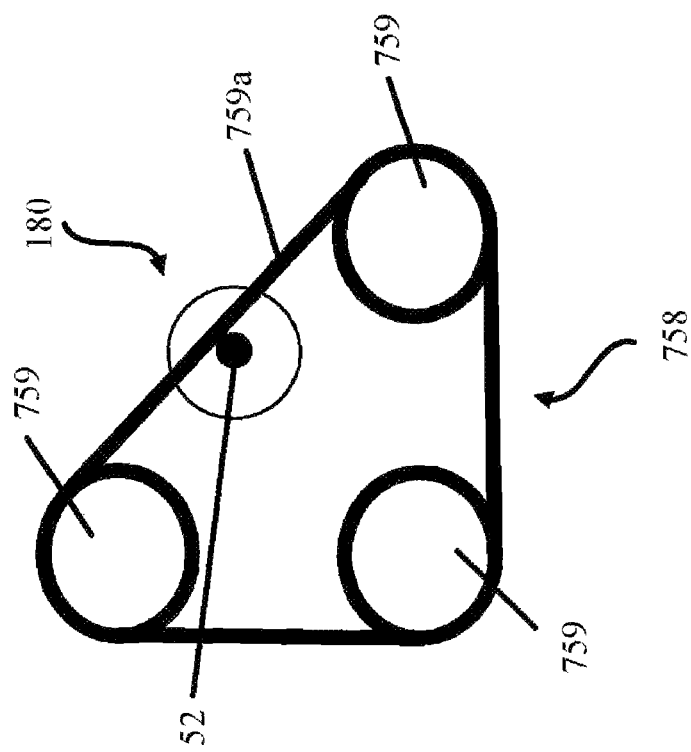
FIG. 7a provides a schematic perspective view of a hydrogen generating sub-arrangement integrated with, and driven by, a pulley and belt arrangement.

FIG. 7b provides a side view of hydrogen generating sub-arrangement 180 integrated with, and driven by, pulley and belt arrangement 758.

Figure 8B:
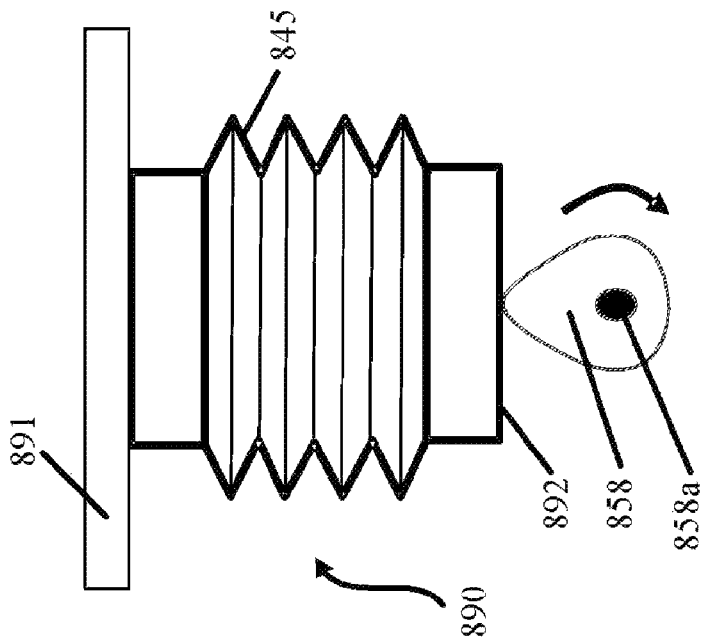
FIGS. 8a and 8b provide schematic perspective views of a hydrogen generating apparatus having a mechanical cam arrangement, with FIG. 8a showing a relaxed configuration of the hydrogen generating apparatus, and FIG. 8b showing a compressed configuration thereof.
Figure 8A:
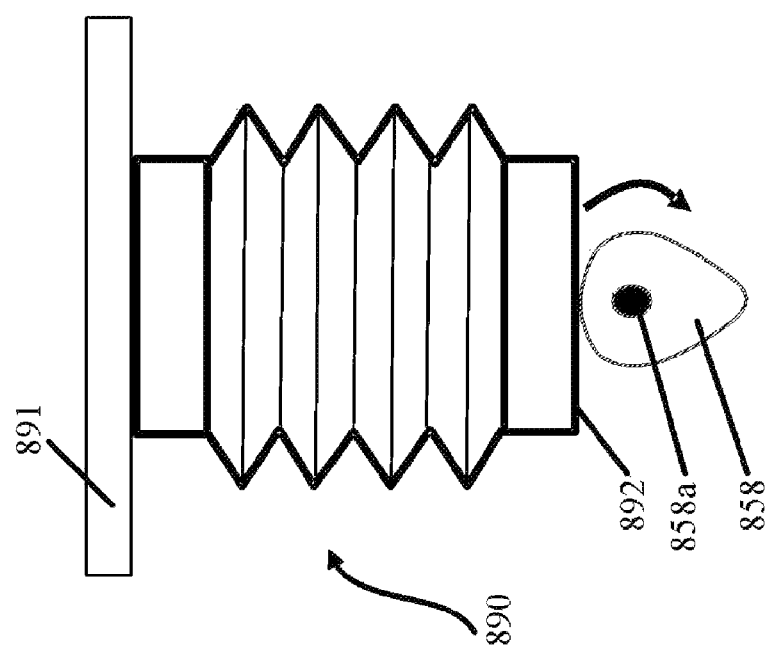

Another exemplary powering arrangement is provided in FIGS. 8a and 8b. FIG. 8a provides a perspective view of a hydrogen generating apparatus such as apparatus 890, which may be similar to apparatus 690 described hereinabove. Apparatus 890 may include a support or platform 891, which may advantageously house, or at least partially house, the hydrogen outlet and cooling water connections (not shown). At a distal end 892, with respect to support 891, of apparatus 890, is disposed a drive means such as a mechanical cam 858 having a rotating shaft or axis such as eccentrically positioned shaft 858a.

With specific reference now to FIG. 8a, a short end of cam 858 faces, and may contact, end 892 of apparatus 890. The relatively small distance between the short end of cam 858 and shaft 858a enables apparatus 890 to assume a relaxed or open position. As shaft 858a rotates, the long or pointed end of cam 858 is urged against end 892 of apparatus 890, as shown in FIG. 8b. Consequently, side walls 845 of apparatus 890 are compressed, such that a scraping of the brush against the aluminum-containing surface (not shown), within apparatus 890, is effected.

An alternative manually-driven apparatus may have a small lever adapted to automatically move the brush assembly. The lever may be powered by a small rechargeable battery or capacitor.

In another embodiment of the invention, a hand-held unit resembling a nutcracker or grip exerciser may have a spring (or other activation element), allowing a squeezing action, between the handles, on manually-driven apparatus 590 or the like. The use of this mechanism enables the user to pump harder than is possible with the fingers alone, such that a higher hydrogen output may be attained. The fuel cell may be disposed directly on or in the handle, or may be disposed in an adjoining device.

Figure 9A:
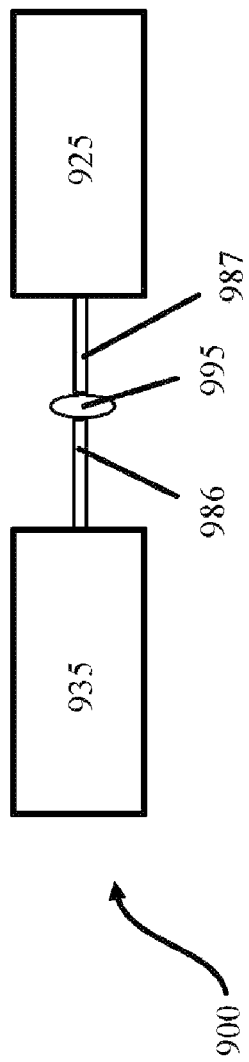
FIG. 9a provides a schematic block diagram of a connecting arrangement adapted to connect between a hydrogen generating system and a power generating system such as a fuel cell.

FIG. 9a provides a schematic block diagram of a connecting arrangement 995 for connecting between a hydrogen generating system 935 and a power generating system such as a hydrogen-consuming fuel cell arrangement 925, according to another embodiment of the present invention. Fluidly communicating between generating system 935 and connecting arrangement 995 is a tube assembly 986. Fluidly communicating between connecting arrangement 995 downstream to fuel cell arrangement 925 is a second tube assembly 987.

Figure 9B:
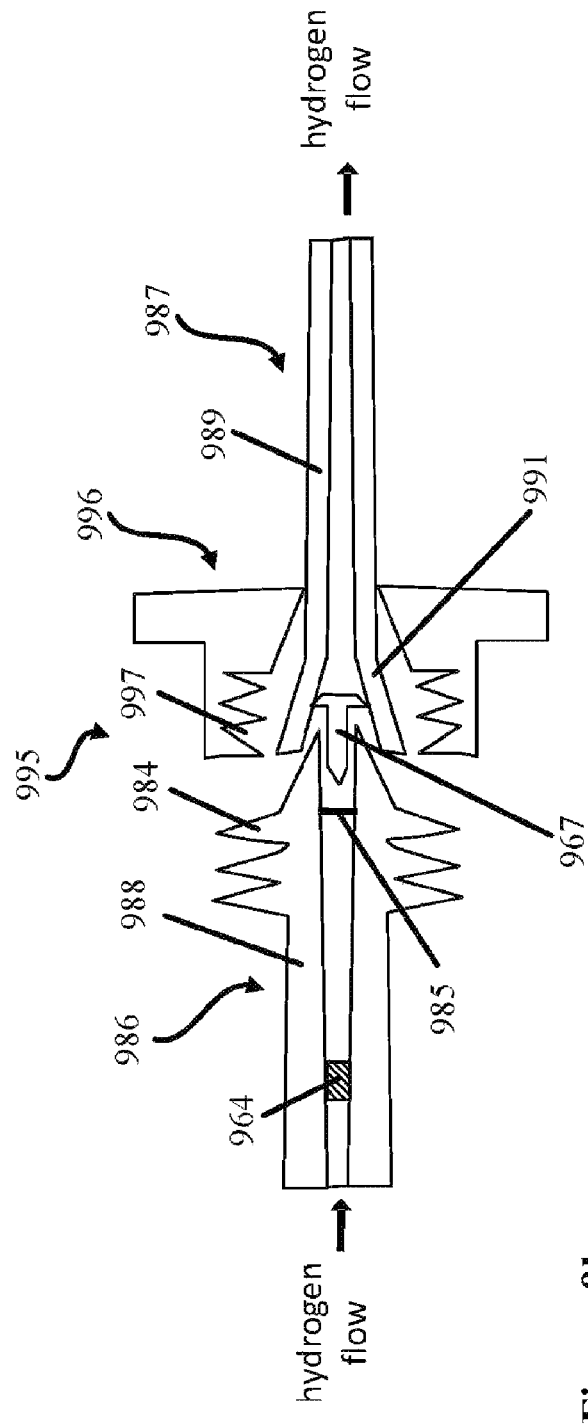
FIG. 9b provides a schematic cross-sectional view of one embodiment of a first tube assembly, connecting arrangement, and second tube assembly, according to another embodiment of the present invention.

A cross-sectional view of one embodiment of tube assembly 986, connecting arrangement 995 and second tube assembly 987 is shown in FIG. 9b. An on-line filter or membrane 964, which selectively passes hydrogen gas (but not water or water vapor), is disposed in a first tube 988 of tube assembly 986. A second membrane 965 disposed in first tube 988, downstream to membrane 964 seals generating system 935 from an outside environment and from fuel cell arrangement 925 (both shown in FIG. 9a).

Second tube assembly 987 may include a second tube 989 having an end 991 such as a flared end adapted to connect to first tube 988. Disposed near (and typically within) end 991 is a piercing unit such as a pin 967, which is adapted to pierce second membrane 965, when second tube assembly 987 is attached to tube assembly 986.

Connecting arrangement 995 and second tube assembly 987 may be associated with, or integral to, fuel cell arrangement 925. Connecting arrangement 995 may include a securing arrangement 996 such as a locking wing nut adapted to secure second tube assembly 987 to tube assembly 986. This may be achieved by complementary connecting surfaces 997, 984, on securing arrangement 996 and on an outer surface of first tube 988, respectively. Typically, connecting surfaces 997, 984 are complementary threaded surfaces.

The above-described arrangement enables the generated hydrogen to safely and robustly reach the fuel cell housed in, or connected to, a computing device, toy, cellular phone or other portable electronic equipment.

All embodiments of the invention, whether specifically disclosed herein or not, will not necessarily have all of the above advantages, nor the same combinations of advantages. Moreover, users of the invention, manufacturers of components or complete systems involving the invention and other persons skilled in the art may identify, with the aid of the present disclosure and/or through experience with the invention, embodiments that inherently include advantages not discussed above.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An apparatus for producing hydrogen gas by mechanical scraping of a surface of an aluminum-containing material, in the presence of an aqueous medium, the apparatus comprising:
    (a) a reaction chamber having a discharge port, and adapted to sealably contain the aqueous medium;
    (b) an aluminum-containing workpiece having a working surface;
    (c) a scraping mechanism having at least one scraping element adapted to contact said working surface, and
    (d) an aqueous medium;
said aluminum-containing workpiece, said scraping element, and said aqueous medium disposed within said chamber,
said chamber adapted to be substantially sealed with respect to an external environment,
said chamber further adapted whereby, during contacting of the aqueous medium and said particles within said chamber, the hydrogen gas evolved is discharged through said discharge port,
said surface and said scraping element adapted to move in a relative motion,
said chamber including a flexible external wall, adapted to be flexed by a force external to said chamber, to achieve said relative motion,
whereby, in a relaxed condition of said external wall, said scraping element is substantially stationary with respect to said working surface,
and whereby, in an operating condition, said scraping element scrapes against said working surface to effect a liberation of aluminum-containing particles from said aluminum-containing workpiece.

2. The apparatus of claim 1, wherein said surface and said mechanism are adapted whereby said force is of a magnitude whereby said relative motion is manually effected by human fingers, hand or foot.

3. The apparatus of claim 1, further comprising a second membrane adapted to provide a substantially hermetical seal to said reaction chamber, and a protruding element, disposed and adapted to puncture, on demand, said second membrane, to enable the hydrogen gas to flow out of said reaction chamber.

4. The apparatus of claim 2, said reaction chamber dimensioned whereby the apparatus is a hand-held apparatus that is portable by means of said fingers, hand or foot.

5. An apparatus for producing hydrogen gas by mechanical scraping of a surface of an aluminum-containing material, in the presence of an aqueous medium, the apparatus comprising:
    (a) a reaction chamber having a discharge port, and adapted to sealably contain the aqueous medium, said chamber adapted to be substantially sealed with respect to an external environment;
    (b) an aluminum-containing workpiece having a curved, generally cylindrical working surface;
    (c) a scraping mechanism having at least one scraping element having a scraping surface adapted to contact said curved, generally cylindrical working surface, and to substantially conform thereto; and
    (d) an aqueous medium, disposed within said reaction chamber,
said aluminum-containing workpiece and said scraping element disposed within said chamber,
said curved, generally cylindrical working surface and said scraping surface adapted to move in a relative motion,
whereby, in an operating condition, said scraping surface scrapes against said working surface to effect a liberation of aluminum-containing particles from said aluminum-containing workpiece,
wherein said scraping element includes at least one brush, said brush having a contact area, whereby, in said operating condition, said contact area is adapted to contact at least 10%, but less than 95%, of said working surface.

6. The apparatus of claim 5, wherein said contact area is adapted to contact at least 20% of said working surface.

7. The apparatus of claim 5, wherein said contact area is adapted to contact at least 30% of said working surface.

8. The apparatus of claim 5, wherein said contact area is adapted to contact at least 40% of said working surface, and less than 90% of said working surface.

9. The apparatus of claim 5, wherein said at least one brush is a plurality of brushes set in spaced condition around said curved cylindrical surface.

10. The apparatus of claim 9, wherein said scraping mechanism has a spring assembly having at least one spring, said assembly and said spring adapted to exert a substantially radial force on said working surface.

11. The apparatus of claim 10, wherein said spring assembly is adapted to continuously exert said radial force on said working surface as a diameter of said workpiece is reduced by at least a factor of 1.5.

12. The apparatus of claim 5, wherein said aqueous medium includes ethylene glycol.

13. The apparatus of claim 5, wherein said scraping element, said spring assembly and said workpiece are disposed and adapted, whereby, in said operating condition, said particles liberated from said aluminum-containing workpiece include elongated particles having orthogonal dimensions x, y, and z, said elongated particles characterized by a dimensionless shape parameter S defined by $$S = x \cdot y/(z^2),$$

wherein S is at least 10, at least 20, at least 30, at least 40, at least 50, at least 60, or at least 80.

14. The apparatus of claim 5, wherein said scraping element, said spring assembly and said workpiece are disposed and adapted, whereby, in said operating condition, at least 30% of said particles liberated from said aluminum-containing workpiece are elongated particles having orthogonal dimensions x, y, and z, said elongated particles characterized by a dimensionless shape parameter S defined by $$S = x \cdot y/(z^2),$$

wherein S is at least 20.

15. The apparatus of claim 5, wherein said scraping element, said spring assembly and said workpiece are disposed and adapted, whereby, in said operating condition, said particles liberated from said aluminum-containing workpiece are, on a statistical weight basis, elongated particles having orthogonal dimensions x, y, and z, said elongated particles characterized by a dimensionless shape parameter S defined by $$S = x \cdot y/(z^2),$$

wherein S is at least 10.

16. The apparatus of claim 5, wherein said scraping element, said spring assembly and said workpiece are disposed and adapted, whereby, in said operating condition, said particles liberated from said aluminum-containing workpiece, after an average residence time of 5 to 10 minutes within the aqueous medium, and after dewatering under a substantially pure nitrogen environment, have, on an average weight basis, an average oxygen to aluminum weight ratio of at least 0.20.

17. The apparatus of claim 5, wherein said scraping mechanism includes a mechanically driven rotating shaft assembly that is at least partially enveloped by said at least one scraping element.

18. The apparatus of claim 5, wherein said brush includes steel bristles.

19. The apparatus of claim 5, wherein said scraping mechanism is adapted to scrape against said curved, generally cylindrical surface to remove, primarily, an oxidized aluminum layer of said generally cylindrical surface.

20. The apparatus of claim 5, said scraping mechanism adapted whereby, in said operating condition, said scraping element is fully engaged against said curved generally cylindrical surface.

* * * * *